United States Patent
Soon et al.

(10) Patent No.: US 7,342,892 B2
(45) Date of Patent: Mar. 11, 2008

(54) CONTROLLED EXCEPTION-BASED ROUTING PROTOCOL VALIDATION

(75) Inventors: Shih Chung Soon, Dublin, CA (US); Larry Katzeff, San Francisco, CA (US); Michael F. Martincello, San Ramon, CA (US); Geethakumari P M Nair, San Ramon, CA (US); Teong Yee Tan, Pleasanton, CA (US)

(73) Assignee: SBC Properties, L.P., Reno, NV (US)

( * ) Notice: Subject to any disclaimer, the term of this patent is extended or adjusted under 35 U.S.C. 154(b) by 1161 days.

(21) Appl. No.: 10/184,039

(22) Filed: Jun. 26, 2002

(65) Prior Publication Data

US 2004/0001443 A1  Jan. 1, 2004

(51) Int. Cl.
 *H04J 1/16* (2006.01)
(52) U.S. Cl. ................... 370/244; 714/712
(58) Field of Classification Search ........... 370/244, 370/389, 252, 241, 250, 253, 242, 243, 245; 709/223, 220, 231; 714/712
 See application file for complete search history.

(56) References Cited

U.S. PATENT DOCUMENTS

| | | | |
|---|---|---|---|
| 5,027,343 A | 6/1991 | Chan et al. | |
| 5,278,834 A * | 1/1994 | Mazzola | 370/469 |
| 5,477,531 A * | 12/1995 | McKee et al. | 370/249 |
| 5,490,249 A | 2/1996 | Miller | |
| 5,652,835 A | 7/1997 | Miller | |
| 5,732,213 A | 3/1998 | Gessel et al. | |
| 5,805,571 A | 9/1998 | Zwan et al. | |
| 5,838,919 A | 11/1998 | Schwaller et al. | |
| 5,850,388 A | 12/1998 | Anderson et al. | |
| 5,881,237 A | 3/1999 | Schwaller et al. | |
| 5,931,961 A * | 8/1999 | Ranganathan et al. | 714/712 |
| 5,991,270 A | 11/1999 | Zwan et al. | |
| 6,069,873 A | 5/2000 | Pugaczewski et al. | |
| 6,185,210 B1 * | 2/2001 | Troxel | 370/395.32 |
| 6,259,677 B1 * | 7/2001 | Jain | 370/252 |
| 6,266,327 B1 * | 7/2001 | Hernandez-Valencia | 370/252 |
| 6,373,822 B1 * | 4/2002 | Raj et al. | 370/252 |
| 7,117,411 B2 * | 10/2006 | McNeely et al. | 714/724 |

* cited by examiner

*Primary Examiner*—Chi Pham
*Assistant Examiner*—Alexander O. Boakye
(74) *Attorney, Agent, or Firm*—Brinks Hofer Gilson & Lione

(57) ABSTRACT

An implementation of a routing protocol in a device is tested by testing how the device reacts to messages and message sequences having potentially adverse conditions. Examples include messages either having a specified message size which is intentionally out-of-conformance with the routing protocol, having a repeated protocol field, absent a mandatory protocol field, or having an incorrect order of protocol fields. Examples also include message sequences having either a specific playback delay between at least one pair of adjacent protocol messages in the first sequence of protocol messages, a specific playback rate for the second sequence of protocol messages, or a modified message order.

21 Claims, 3 Drawing Sheets

CONTROLLED EXCEPTION-BASED ROUTING PROTOCOL VALIDATION

BACKGROUND OF THE INVENTION

1. Field of the Invention

The present invention relates to methods and systems for testing routing protocols.

2. Description of the Related Art

A major aspect of routing protocols is to ensure stability and robustness of a network even when subjected to unexpected events or an erroneous environment. As routing processes heavily depend on updates from the network to make routing decisions, protection of the process with error handling capabilities is important. Routing protocols are structured based on state machines which decide a next state in response to an event. If an unexpected event occurs, a well-structured routing protocol should be able to take necessary steps either to proceed to a known state or to remain in a current state in order to avoid undesirable results such as a network collapse.

Currently, conformance tests are performed for routing protocol validation and qualification. The conformance tests establish acceptance rules that govern correct routing behaviors, such as routing message exchanges in terms of message syntax, semantics, and protocol state transition. Conformance tests are capable of determining correct or expected routing behaviors of packet network elements. However, some field network failures are caused by some exceptions that are not covered by existing conformance testing methods.

U.S. Pat. No. 5,027,343 to Chan et al. discloses a remote test access system for Integrated Services Digital Network (ISDN) testing. A provision of the system is the ability to propagate frame check sequence (FCS) errors, residual bit errors, abort sequences and physical layer failures which are intentionally generated by conformance test suites.

U.S. Pat. No. 5,805,571 to Zwan et al. discloses a dynamic communication line analyzer apparatus and method. The apparatus includes error generation and insertion in protocols to permit dynamic error testing. An analyzer provides the error insertion capability by generating data errors, cyclic redundancy check (CRC) errors, frame errors and bipolar violation errors. Each of the errors may be generated either as single errors or at a specified error rate subject to processor control.

U.S. Pat. No. 6,069,873 to Pugaczewski et al. discloses closed-loop automated testing of system equipment and management. A set of tests are generated which inject predetermined errors into a tested device to test for compliance with protocol standards.

U.S. Pat. No. 6,373,822 B1 to Raj et al. discloses a data network protocol conformance testing system. The protocol conformance testing system creates negative protocol testing conditions with abnormal state packet sequences or packets with erroneous or invalid fields that relate to state transition. Also, protocol data structure testing is performed by sending fields of packets containing data values at upper and lower limits as dictated by specifications. Extreme and out-of-bound values are also sent in the packets and the responses of a unit-under-test are verified.

In general, passing any of the currently-available conformance tests does not necessarily guarantee that the network will be reliable under all failure conditions. Network outages due to routing protocol failures in live networks often involve unexpected or previously unknown triggering causes that are not covered in existing conformance testing methods and systems.

BRIEF DESCRIPTION OF THE DRAWINGS

The present invention is pointed out with particularity in the appended claims. However, other features are described in the following detailed description in conjunction with the accompanying drawings in which:

DETAILED DESCRIPTION OF THE PREFERRED EMBODIMENTS

Embodiments of the present invention provide improved methods and systems for validating the soundness and completeness of a routing protocol implementation in a packet network environment. Disclosed herein are testing capabilities that test exceptions and unexpected network scenarios relevant to field outages in testers and testing methods. A test administrator can create specific test scenarios that reflect failure triggers (i.e. failure conditions) learned from previously-occurring network failures. Based on the results of the test, changes can be made to the network to improve its reliability subject to the failure triggers.

The herein-disclosed testing methods and systems provide a user-friendly approach to verifying the stability of a routing protocol by negative testing techniques in addition to conformance testing. The methods and systems allow message content and playback rate to be modified in ways not defined by the routing protocol implementation. Examples include, but are not limited to, generating a valid message with an invalid message size and/or format, generating invalid values for some information elements in a valid message format, and generating an invalid message with errors. The testing system generates and sends the modified messages to a device under test (DUT) at any specified rate or delay. The device under test may be in any of a plurality of different states when subjected to the modified messages.

The methods and systems also allow interaction between a node in the network and the DUT to be captured and recorded. The interaction, comprising a sequence of exchanged messages, is saved in a machine-readable format and is displayable in a human-readable format. The recorded messages may be modified and arranged to form test sequences. The testing device replaces the node in the network to subject the DUT to the test sequences. The testing device may subject the DUT to out-of-sequence messages causing unexpected events, an abnormal rate of messages, or an intolerable delay between messages. This may cause unknown or incorrect state transitions in the testing device.

The methods and systems also allow user-defined sequences (i.e. non-recorded sequences) to be applied to the DUT. The user-defined sequences enable network failure scenarios to be triggered. Thus, a user can discover weak elements of the state machine in the protocol implementation.

Finally, the methods and systems capture, decode, analyze and display the responses generated by the DUT in response to the sequences.

Figure 1:
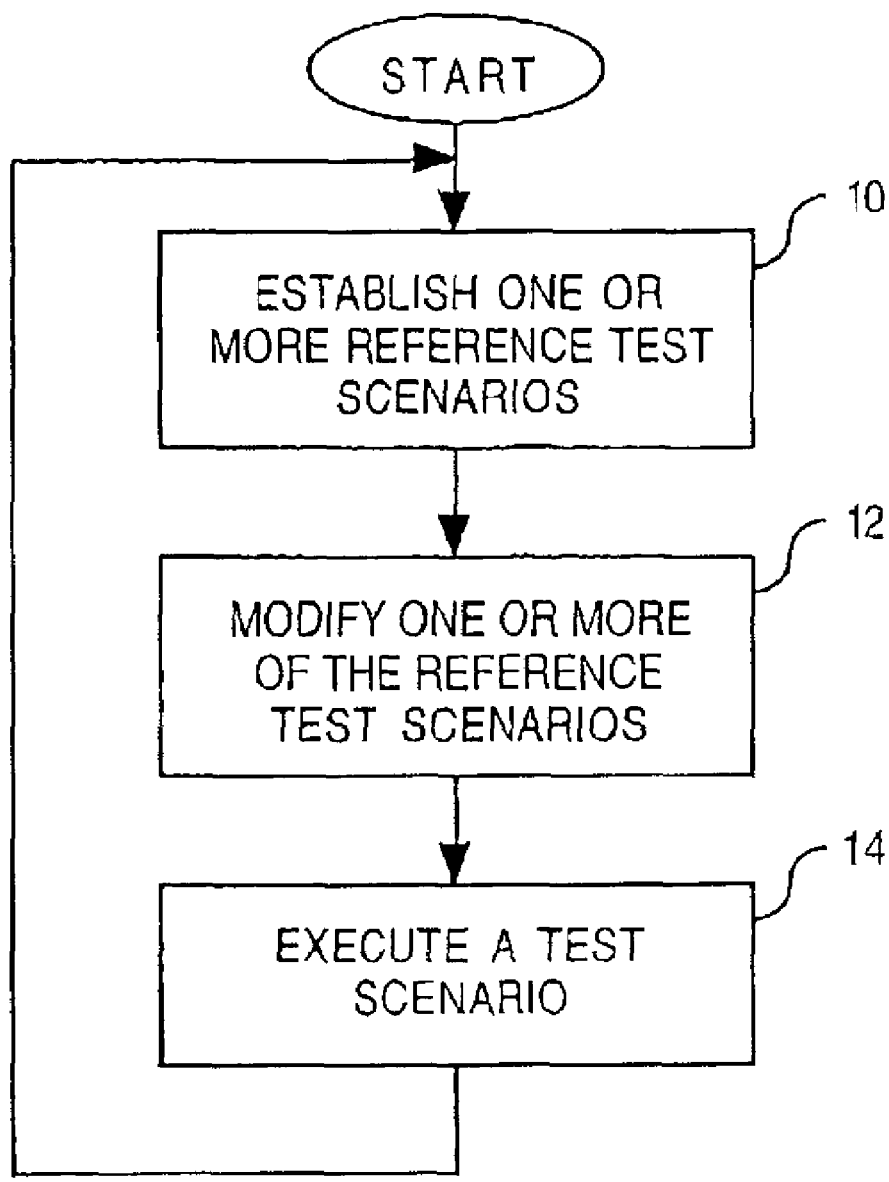
FIG. 1 is a flow chart of an embodiment of a routing protocol testing method in accordance with the present invention.

FIG. 1 is a flow chart of an embodiment of a routing protocol testing method in accordance with the present invention. As indicated by block 10, the method comprises establishing one or more reference test scenarios. Each reference test scenario can be established by creating a testbed of a network-under-test, establishing an initial network topology, and placing testing devices at one or more various points in the network-under-test. Typically, a test point is a link between two nodes. Each testing device may have modes of operation for monitoring protocol message exchanges between nodes on a link, and selectively recording all or specified ones of the messages.

After the testing devices have been implemented, the network-under-test is initialized, and the routing protocol under test is activated. As the routing protocol converges to a steady state, the testing devices record protocol message exchanges. Each testing device attaches a time stamp with appropriate time resolution to each recorded message to indicate a timing of the message. The recorded message sequences at each of the testing points form a base test scenario.

Optionally, topological changes or other controlled activities can be made to the network. Examples of the topological changes include, but are not limited to, removal of network nodes and trunks in the network. The testing devices can record message sequences which result from the topological changes.

As indicated by block 12, the method comprises modifying one or more reference test scenarios. Each reference test scenario can be modified to reflect specific triggers or causes of routing protocol failures. Acts of modifying include changing the specific message syntax and/or semantics, changing message positions in the sequence, and/or changing the timing and synchronization of the message sequences. Modifying the message syntax and/or semantics may produce invalid syntax and/or semantics, such as an invalid message size, invalid message field values, invalid message formats, topological conflicts, and redundant topological representation. Changing message positioning may include removing selected protocol messages, inserting user-defined protocol messages, and duplicating protocol messages in the sequences. Examples of modifying the timing and synchronization of the message sequences include modifying the message delivery rate, introducing controlled delays between adjacent messages, and introducing controlled delays for specific messages. The modifications may include specifying playback time stamps and inter-sequence synchronization of message delivery to fully describe the cause of failure. Playback of the modified sequences is coordinated for specific timing and synchronization relationship between the sequences, such as simultaneous playback of selected ones or all modified message sequences, and delayed playback of selected ones of the message sequences.

As indicated by block 14, the method comprises executing a test scenario. The test scenario comprises subjecting a DUT to the modified message sequences formed in block 12, and testing how the DUT reacts. The modified message sequences are played back in a coordinated manner from the testing device(s) to the network under test. The playback is controlled according to the inter-sequence timing and synchronization specified in block 12.

The testing devices can simulate a virtual network topology. In this case, timing and synchronization of message exchanges may be controlled directly via a protocol state machine that governs the specific routing protocol. Timing and synchronization of message exchanges are characterized by a message delivery rate (e.g. measured in bits per second), a number of messages per unit time, a delay between adjacent protocol messages, and a delay for specific ones of the protocol messages.

Figure 2:
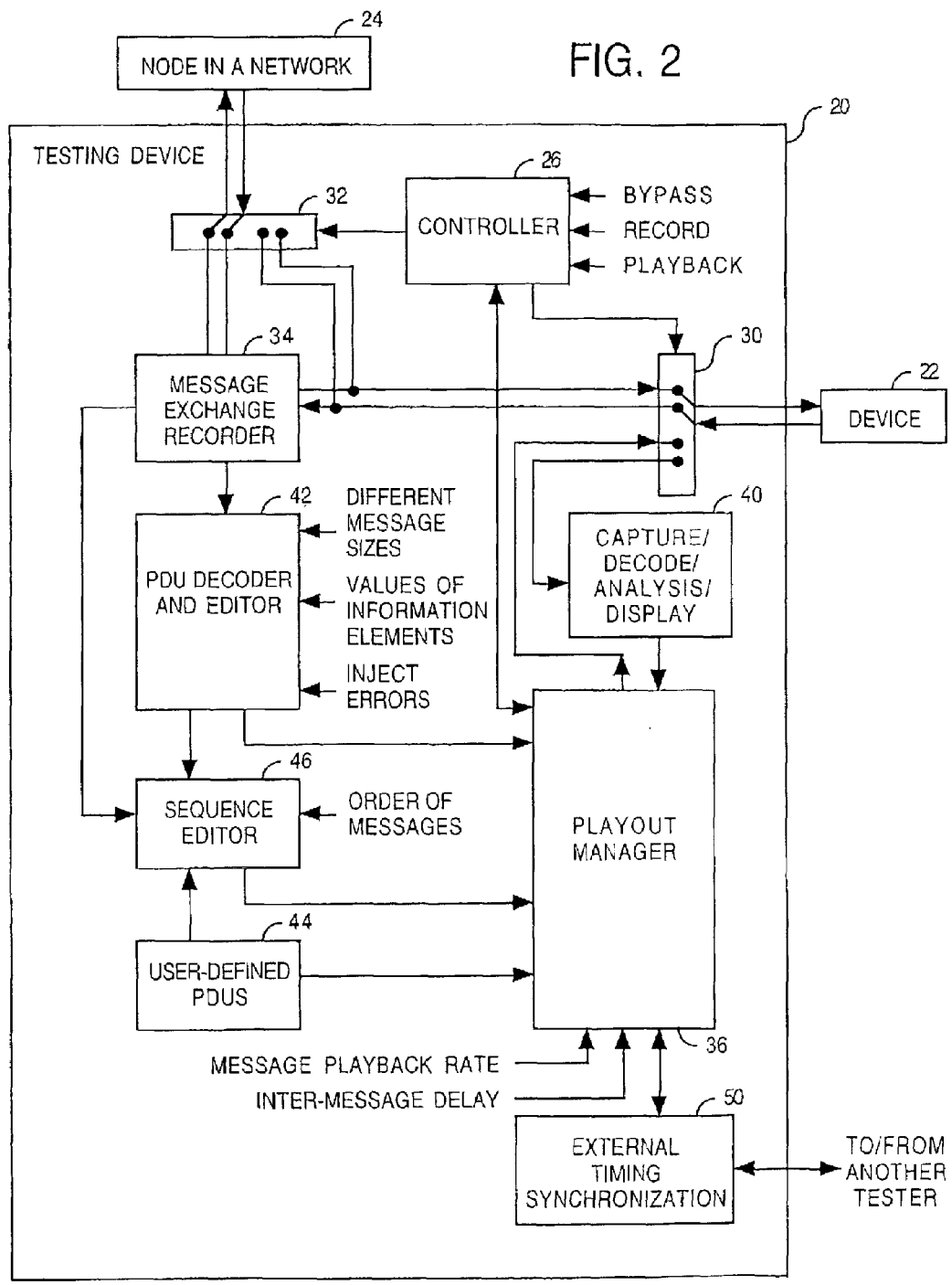
FIG. 2 is a block diagram of an embodiment of a testing system in accordance with the present invention.

FIG. 2 is a block diagram of an embodiment of a testing system in accordance with the present invention. The system comprises a testing device 20 to perform the acts described with reference to FIG. 1. The testing device 20 interfaces with a device under test (DUT) 22 and a node 24 in a network.

The testing device 20 is capable of operating in a plurality of different modes as directed by a controller 26. The different modes include a message recording mode, a playback mode, and a bypass mode. The controller 26 controls switching devices 30 and 32 to facilitate the different modes.

In the message recording mode, a message exchange recorder 34 is selectively coupled to the DUT 22 and the node 24 by the switching devices 30 and 32, respectively. The message exchange recorder 34 records messages exchanged between the DUT 22 and the node 24.

In the playback mode, a playout manager 36 and a message capture component 40 are selectively coupled to the DUT 22 by the switching device 30. The playout manager 36 serves to playback test sequences to the DUT 22. The message capture component 40 serves to capture, decode and analyze messages received from the DUT 22 in response to the test sequences.

In the bypass mode, the switching devices 30 and 32 selectively bypass the message exchange recorder 26, the message generator 46, and the message capture component 40 from the DUT 22 and the node 24. Thus, the switching devices 30 and 32 selectively facilitate normal communication between the DUT 22 and the node 24 without recording the exchanges or playing back test messages.

The testing device 20 provides an editor to assist in the creation of a test suite. The editor comprises a Protocol Data Unit (PDU) decoder and editor component 42, a user-defined PDA editor component 44, and a sequence editor component 46. The PDU decoder and editor component 42 is responsive to the message exchange recorder 34 to decode PDUs in the recorded messages and to allow users to edit the PDUs to form modified messages. The user-defined PDU editor component 44 allows users to create and edit messages from scratch. User-defined protocol messages are stored in the same format as those captured. The sequence editor component 46 allows users to create sequences of messages based on recorded/modified messages from the PDU decoder and editor 42 and user-defined messages from the user-defined PDU editor component 44. Using the sequence editor component 46, users can generate specific sequences by reordering any combination of recorded messages, modified messages and user-defined messages.

Using the editor, a user can make selections from a list of protocol messages. For a selected protocol message, the editor displays all of its fields as defined by the protocol specification. Each field is identified and populated by default values defined in the protocol. Fields without default values are left blank or otherwise unpopulated. Using the editor, the user can enter values for one or more of the fields. Thereafter, the user can request that the edited message be saved. In response to the request, the editor checks all of the fields and provides error or warning messages for any field that has an incorrect value. The user has the option of either correcting one or more of the errors prior to saving the message, or saving the message with the errors to be used in negative testing.

When creating message sequences, the sequence editor 46 causes the sequence being created to displayed in a summary format. The summary format lists the protocol messages by names used in the protocol specification. In response to a user selection of one of the protocol messages in the list, the above-described edit mode is activated for the selected message. The selected message may then be edited and saved. After the message is saved, the edit mode is exited and the summary format of the sequence is displayed.

The sequence editor 46 enables users to copy protocol messages directly from a captured protocol sequence into a user-defined sequence. Thus, users need not manually enter capture sequences into the user-defined sequence. The captured sequence and user-defined sequence have a common format to facilitate said copying.

The editor provides an option of having a message length field of a user-defined message either automatically populated with a correct value or user-specified to an incorrect value for negative testing. The editor further provides an option of having any Frame Check Sequence (FCS) either calculated automatically or inserted manually for negative testing.

The playout manager 36 plays back one or more of the created test message sequences to the DUT 22. The playout manager 36 allows user control of a delay between adjacent messages (i.e. an inter-message delay). The playout manager 36 also allows user control of a playback rate at which a message or sequence is transmitted to the DUT 22. The playout manager 36 may support a mainstream scripting language to provide the capability to control the sending, receiving and timing of test message sequences. Examples of the scripting language include, but are not limited to, TK, TCL and EXPECT. The scripting language may have access to and control of all functions of the test environment, including a protocol state machine. Preferably, the protocol state machine has protocol states which are fully defined and functional. This allows the protocol state to be automatically determined based on transmission/reception of protocol messages to/from the DUT 22. TCL extensions may be provided to set and read the protocol states to enable users to force a state.

The test message sequences from the testing device 20 cause the DUT 22 to respond. The message capture component 40 captures, decodes, analyzes and displays the response messages from the DUT 22. The decoded messages may be displayed with a time stamp for analysis purposes. The decoded messages may be stored as a text file which helps to automate analysis using scripts.

The testing device 20 further comprises an external timing synchronization component 50 to direct the timing of message playback by the playout manager 36. The external timing synchronization component 50 allows a timing relationship to be established between the testing device 20 and one or more other like testing devices. The external timing synchronization component 50 provides an interface with which signals are communicated to a like interface of a like testing device via an external trigger module, a local area network or another communication network.

Thus, in general, a group of testing devices may be networked using the interface of the external timing synchronization component 50. Preferably, the interfaces in the group are protected from interruptions from other users.

To coordinate and control timing activities, one of the external timing synchronization components in the group acts as a master, while others in the group acts as slaves. The entire playback configuration is accessible from the master so that the master can determine the timing relationship between different sequences and the messages within the messages. The master sends appropriate messages to the slaves to direct their playback operation.

A function of the message synchronization capability is that a user can insert explicit synchronization flags either in front of or after specific messages in the message sequence for playout purposes. These flags are "go" signals based on a set of synchronization conditions, for example "signal Sequence X of Message Y playout completion". For example, a synchronization flag can be inserted in front of Message A in Sequence 1 specifying that "go until receive a Message B playout completion signal from Sequence 2 and Message C playout completion signal from Sequence 3". In this example, Message A is played out from Sequence 1 only after Message B is played out in Sequence 2 and Message C is played out in Sequence 3.

A time stamp field in each playout sequence may be based on an incremental time measurement which specifies an exact delay of message playout from playout completion of the previous message. The incremental time stamp may be calculated based on a targeted message delivery rate and a message size. User-specific synchronization conditions via the above-mentioned synchronization flags can be imposed on a specific or selected set of messages in a sequence to change the playout synchronization in addition to the inter-message delay controlled by the incremental time stamp.

Specific examples of testing acts which may be performed by the testing device 20, include but are not limited to, the following:

1. Intentionally generating an incorrect value for one or more mandatory or non-mandatory protocol fields in a message during different states of the routing protocol. For example, either a protocol message size not equal to a PDU length or an unknown protocol version during initialization may be intentionally generated after database synchronization.

2. Generating a protocol message with a repeated mandatory or non-mandatory protocol field or repeating the entire message with modification of a selected field in the same sequence during different states of the routing protocol. For example, the protocol version field may be repeated twice in a message. As another example, this act may comprise repeating the message in the sequence with a duplicated message identification field (e.g. a MessageID field).

3. Generating a protocol message without a mandatory or non-mandatory protocol field during different states of the routing protocol. For example, the protocol version field may be missing from a message.

4. Generating a protocol message with an incorrect and/or unexpected order of mandatory or non-mandatory protocol fields during different states of the routing protocol.

5. Intentionally generating a valid protocol message with an unexpected high or low rate during different states of the routing protocol. For example, protocol messages may be generated at a line rate.

6. Re-ordering the sequence of messages between and/or during state changes in the DUT 22. For example, a "sync done" message may be sent when the protocol state is in an "attempt" state.

7. Repeating the same message between and/or during state changes in the DUT 22. For example, an "attempt" message may be repeatedly sent.

8. Restraining from sending the required messages between and/or during state changes in the DUT 22.

9. Sending messages with incorrect sequence numbers (e.g. different sequence numbers than those agreed between the nodes during handshaking).

10. Sending protocol messages in a sequence with an unexpected or unacceptable high or low inter-message delay between and/or during state changes in the DUT 22.

11. Sending protocol messages in a sequence with an unexpected or unacceptable high or low playback rate between and/or during state changes in the DUT 22.

12. Omitting status or acknowledgment messages in a sequence between and/or during state changes in the DUT 22.

13. Generating an unexpectedly high number of status or acknowledgment messages between and/or during state changes in the DUT 22.

14. Generating messages with unexpected error codes, status, or acknowledgment between and/or during state changes in the DUT 22.

15. Responding with unexpected messages when the DUT 22 is in a specific state.

The herein-disclosed testing device 20 can be implemented using a computer system directed by computer program code stored by a computer-readable medium. Examples of the computer-readable medium include, but are not limited to, a magnetic storage medium such as a hard disk or a floppy disk, an optical storage medium such as a compact disk or a DVD, and an electronic storage medium such as an electronic memory. The computer program code directs the computer system to perform the acts and provide the functionality described herein. The computer system comprises a display device to display information to the user, and at least one input device to receive user-initiated inputs. Examples of the display device include, but are not limited to, a cathode ray tube, a liquid crystal display and a gas plasma display. Examples of the at least one input device include, but are not limited to, a keyboard, a voice input device, and a pointing device such as a mouse, a pointing stick, a touch pad, a touch screen, or a track ball.

Figure 3:
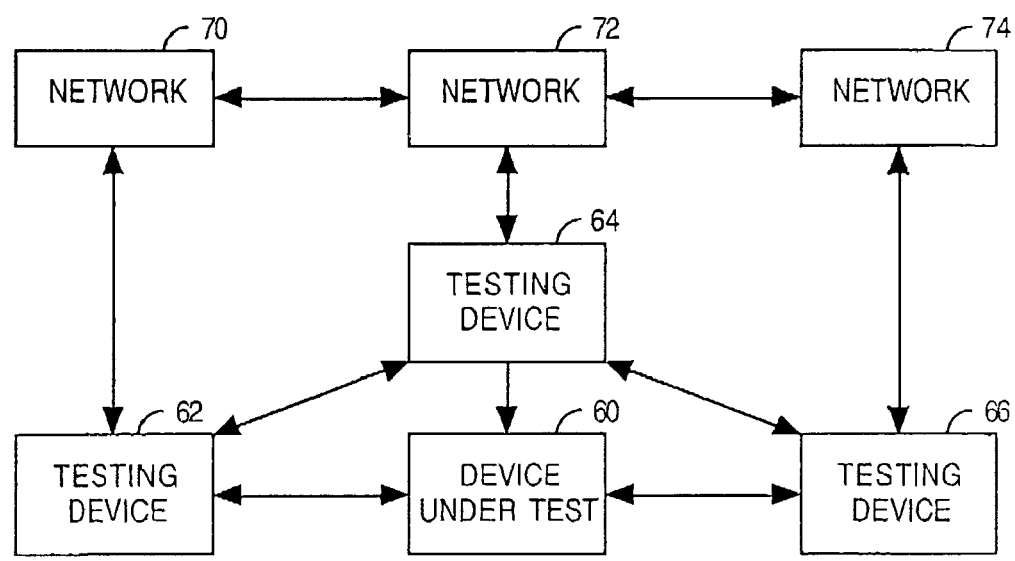
FIG. 3 is a block diagram of a test scenario which uses multiple testing devices to test a device.

FIG. 3 is a block diagram of a test scenario which uses multiple testing devices to test a device 60. For purposes of illustration and example, three testing devices 62, 64 and 66 are employed in the test scenario, although those having ordinary skill will recognize that the teaching herein may be extended to other numbers of testing devices.

The device 60 gets routing updates from a first network 70 through the testing device 62. The device 60 gets routing updates from a second network 72 through the testing device 64. The device gets routing updates from a third network 74 through the testing device 66. As all of the networks 70, 72 and 74 are interconnected, the device 60 contemporaneously gets correlated updates from all three paths.

The test scenario makes use of timing relationships between message exchanges recorded by the testing devices 62, 64 and 66. After the testing devices 62, 64 and 66 contemporaneously record all message sequences exchanged between the device 60 and the networks 70, 72 and 74, the sequences may be re-organized and/or time stamps on selected messages may be re-defined to produce test sequences. The testing devices 62, 64 and 66 contemporaneously generate the test sequences in accordance with synchronized message timing. The behavior of the device 60 can be evaluated when: (a) the updates are received in a non-coherent fashion; (b) conflicting messages are received; (c) expected events occur after unexpected delays; and/or (d) incorrect topology information is received.

It will be apparent to those skilled in the art that the disclosed inventions may be modified in numerous ways and may assume many embodiments other than the preferred forms specifically set out and described herein.

Accordingly, it is intended by the appended claims to cover all modifications which fall within the true spirit and scope of the present invention.

What is claimed is:

1. A method of testing an implementation of a routing protocol in a device, the method comprising:
   providing a sequence of protocol messages;
   introducing a specific playback delay between at least one pair of adjacent protocol messages in the sequence of protocol messages; and
   testing how the device reacts to the sequence of protocol messages with the specific playback delay;
   wherein the specific playback delay is to cause a protocol state transition in the device which differs from an expected protocol state transition absent the specific playback delay.

2. The method of claim 1 wherein the specific playback delay is introduced for a specific message in the sequence of protocol messages.

3. The method of claim 1 wherein the specific playback delay is introduced between a protocol state change in the device.

4. The method of claim 1 wherein the specific playback delay is introduced during a protocol state change in the device.

5. A method of testing an implementation of a routing protocol in a device, the method comprising:
   generating a first message having a specified message size which is intentionally out-of-conformance with the routing protocol;
   testing how the device reacts to the first message;
   generating a second message having a repeated protocol field;
   testing how the device reacts to the second message;
   generating a third message absent a mandatory protocol field;
   testing how the device reacts to the third message;
   generating a fourth message having an incorrect order of protocol fields;
   testing how the device reacts to the fourth message;
   providing a first sequence of protocol messages;
   introducing a specific playback delay between at least one pair of adjacent protocol messages in the first sequence of protocol messages;
   testing how the device reacts to the first sequence of protocol messages with the specific playback delay;
   providing a second sequence of protocol messages;
   testing how the device reacts to a specific playback rate for the second sequence of protocol messages;
   recording a third sequence of protocol messages exchanged between the device and a network node;
   modifying an order of the protocol messages in the third sequence to form a test sequence of the protocol messages;
   testing how the device reacts to the test sequence;
   providing a plurality of sequences of protocol messages;
   introducing a specific playback delay between adjacent sequences in the plurality of sequences of protocol messages; and
   testing how the device reacts to the plurality of sequences with the specific playback delay.

6. A system for testing an implementation of a routing protocol in a device, the system comprising:
   a playout manager to generate a sequence of protocol messages with a specific playback rate; and a message capture component to test how the device reacts to the specific playback rate for the sequence of protocol messages;

wherein the specific playback rate is to cause a protocol state transition in the device which differs from an expected protocol state transition absent a specific playback delay.

7. The system of claim 6 wherein the specific playback rate is introduced between a protocol state change in the device.

8. The system of claim 6 wherein the specific playback rate is introduced during a protocol state change in the device.

9. A system for testing an implementation of a routing protocol in a device, the system comprising:
 a message exchange recorder to record a sequence of protocol messages exchanged between the device and a network node;
 an editor to modify an order of the protocol messages in the sequence to form a test sequence of the protocol messages;
 a playout manager to generate the test sequence of the protocol messages; and
 a message capture component to test how the device reacts to the test sequence.

10. A system for testing an implementation of a routing protocol in a device, the system comprising:
 a first testing device which couples the device to a first network, the first testing device including:
  a message exchange recorder to record a first sequence of protocol messages exchanged between the device and the first network;
  a synchronization component; a
  playout manager to generate a first test sequence of messages based on the first sequence, wherein the messages in the first test sequence are generated with a timing based on the synchronization component; and
  a message capture component to test how the device reacts to the first test sequence;
 a second testing device which couples the device to a second network, the second testing device including:
  a message exchange recorder to record a second sequence of protocol messages exchanged between the device and the second network contemporaneously with the first sequence of protocol messages;
  a synchronization component whose timing is influenced by the synchronization component of the first testing device;
  a playout manager to generate a second test sequence of messages based on the second sequence, wherein the messages in the second test sequence are generated with a timing based on the synchronization component; and a message capture component to test how the device reacts to the second test sequence.

11. The system of claim 10 wherein the first network and the second network are in communication, and wherein the first and second sequences of protocol messages are correlated.

12. The system of claim 10 wherein the first test sequence and the second test sequence are generated to non-coherently provide the recorded messages to the device.

13. The system of claim 10 wherein the first test sequence and the second test sequence are generated to provide conflicting messages to the device.

14. The system of claim 10 wherein the first test sequence and the second test sequence are generated to introduce an expected event to the device after an unexpected delay.

15. The system of claim 10 wherein the first test sequence and the second test sequence are generated to introduce incorrect topology information to the device.

16. A method of testing an implementation of a routing protocol in a device, the method comprising:
 recording a first sequence of protocol messages exchanged between the device and a first network;
 recording a second sequence of protocol messages exchanged between the device and a second network contemporaneously with the first sequence of protocol messages;
 contemporaneously generating a first test sequence of messages based on the first sequence and a second test sequence of messages based on the second sequence; and
 testing how the device reacts to the first test sequence and the second test sequence.

17. The method of claim 16 wherein the first network and the second network are in communication, and wherein the first and second sequences of protocol messages are correlated.

18. The method of claim 16 wherein the first test sequence and the second test sequence are generated to non-coherently provide the recorded messages to the device.

19. The method of claim 16 wherein the first test sequence and the second test sequence are generated to provide conflicting messages to the device.

20. The method of claim 16 wherein the first test sequence and the second test sequence are generated to introduce an expected event to the device after an unexpected delay.

21. The method of claim 16 wherein the first test sequence and the second test sequence are generated to introduce incorrect topology information to the device.

* * * * *